D. B. FULLER.
Improvement in Machines for Sheeting Dough.
No. 124,431.
Patented March 12, 1872.
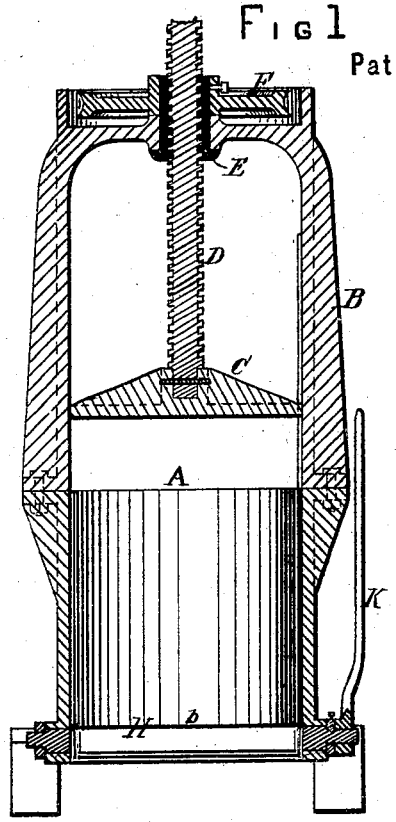
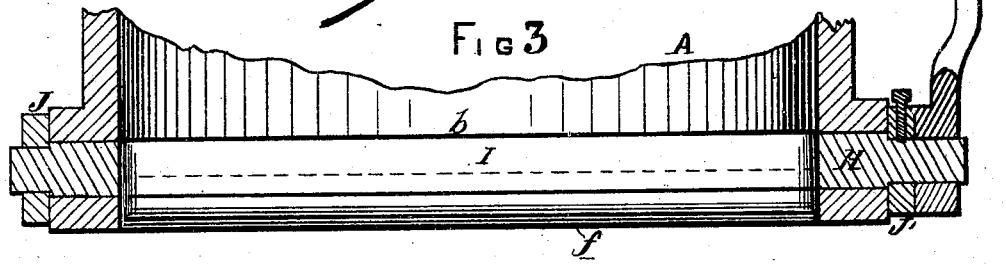
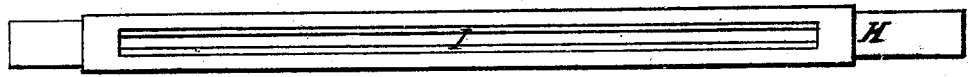
WITNESSES. Isaac Townsend, Isaac R. Oakford.
Dwight B. Fuller, INVENTOR.

UNITED STATES PATENT OFFICE.

DWIGHT B. FULLER, OF PHILADELPHIA, PENNSYLVANIA.

IMPROVEMENT IN MACHINES FOR SHEETING DOUGH.

Specification forming part of Letters Patent No. 124,431, dated March 12, 1872.

Specification describing certain Improvements in Machine for Sheeting Dough, invented by DWIGHT B. FULLER, of the city and county of Philadelphia and State of Pennsylvania.

This invention relates to a machine in which the dough placed in a mass within a receiver is forced, by means of a vertical-moving follower, out through a longitudinal slot made in the bottom of the receiver, to form a sheet of the required thickness. The object of the present invention is to provide a simple device for more effectually cutting off the dough in proper lengths as it issues from the receiver, and also for regulating the thickness.

Figure 1 is a vertical section of a machine embodying my invention. Fig. 2 is a sectional view, enlarged, of the lower portion of the receiver, showing an end view of the device for cutting off the dough. Fig. 3 is also a sectional view, enlarged, showing a longitudinal section of the cutting device. Fig. 4 is a detached view of the slotted shaft, with which the sheet of dough is cut.

The cylinder A, made open at the top and closed at the bottom, with the exception of a longitudinal slot, $b$, is supported at the proper height on any suitable framing, and has mounted on its upper flange a cast-iron frame, B. The follower C is secured to the lower end of a threaded stem, D, which passes upward through a cylindrical nut, E, placed in a suitable opening made in the upper portion of the frame B. The nut E is made of the proper length to pass through the hub of a worm-wheel, F, and is secured to and revolves with it. The stem and follower are thus caused to move vertically without revolving. The wheel F receives motion from a worm-shaft and pulleys, not shown in the drawing. In the metal at the bottom of the cylinder A, Fig. 2, is formed a circular cavity, G, in which is placed a shaft, H, having a tapering slot, I, made axially through it, equal in length to the longitudinal slot $b$, or inside diameter of the cylinder, Fig. 3. The slot $f$, leading from the cavity G, has its edges rounded off, as shown at $d$ and $d'$, Fig. 2, with the surface of the edge $d$ polished, to present a smooth surface to the dough passing out the cylinder. The shaft H projects through the sides of the cylinder, and is provided with collars J J' for retaining it in position; and on one end is placed a lever, K, for operating it. The said shaft operates in the cavity G on the same principle as the plug in an ordinary stop-cock, the rotation of it causing either an increased or diminished extent of opening.

The dough is placed in a mass in the cylinder, and the follower C, receiving motion from the worm-wheel F, presses it (the dough) in the form of a sheet through the slot in the cylinder and shaft. The instant a sheet of the required length has passed through, the shaft H is turned sufficiently to sever the dough at the slot $f$, from whence it falls onto a carriage placed below to receive it. The width of the slot $f$ underneath the shaft is varied to regulate the thickness of the sheet by turning the shaft the required distance. The slot in the shaft H is made tapering, in order to produce a sharper cutting-edge when it is brought in proximity to the edge $d$ of the cavity G, Fig. 2. The edge of the sheet of dough is thus cut clear and completely from the dough in the cylinder, no straggling ends or remnants remaining.

I claim as my invention—

1. The combination, in a machine for sheeting dough, of the cylinder A, shaft H, follower C, threaded stem D, nut E, and worm-wheel F, operating substantially in the manner as herein shown and described.

2. In combination with the cylinder A, provided with the slots $b$ and $f$ and cavity G, the shaft H, provided with a tapering slot, I, for regulating the thickness and cutting off the sheets of dough, as specified.

DWIGHT B. FULLER.

Witnesses:
ISAAC TOWNSEND,
ISAAC R. OAKFORD.